3,162,612
ACYL AMINO CARBOXYLIC ACIDS AS PROCESSING AIDS FOR SYNTHETIC RUBBER-LIKE POLYMERS
William R. Peterson and Ralph E. McNay, Houston, Tex., assignors, by mesne assignments, to Ashland Oil & Refining Company, Ashland, Ky., a corporation of Kentucky
No Drawing. Filed Dec. 26, 1962, Ser. No. 247,283
18 Claims. (Cl. 260—31.2)

This invention relates to the processing of synthetic rubber-like polymers. More particularly, it relates to a method of improving the processing characteristics of synthetic rubber-like polymers and to the products thereby obtained.

In recent times, various types of synthetic rubber-like polymers have been prepared as potential replacements for natural rubber. Some of these have been received with enthusiasm while still others, in spite of their excellent physical characteristics, have met with difficulties because of poor mill processing behavior, lack of tack, or both.

An outstanding polymer in many regards is polybutadiene. Polybutadiene is known to possess excellent physical properties. Despite its excellent properties, however, it is especially difficult to process. Not only does the polymer band ineffectively and bank poorly on the mill, but the incorporation of pigments therein is not readily accomplished. Although these properties can be improved to some degree by milling in the presence of a softener, any improvement demonstrated is marginal at best.

Other synthetic rubber-like polymers are also similarly plagued as regards processibility to one degree or another. For instance, even the highly commercially useful styrene-butadiene polymers while they can usually be readily compounded on a mill when the polymer Mooney viscosity is below about 35 ML-4, at increasingly higher Mooney levels milling becomes progressively more difficult.

It is a principal object of this invention, therefore, to provide a method for improving the processibility characteristics of synthetic rubber-like polymers, particularly difficult to process polybutadiene and high Mooney styrene-butadiene polymers. It is a further object of this invention to provide a method for improving the mill processing behavior of such polymers. It is a still further object of this invention to provide a method for imparting to such polymers an improved quality of tack. Another object of this invention is to obtain such improved characteristics without sacrificing other polymer properties. Another object is to render such improvements by a method which is simple and economical.

These and other objects are achieved in accordance with the present invention which comprises incorporating into synthetic rubber-like polymers an effective amount of a processing aid consisting essentially of an amino acid compound, or mixture of such compounds, as hereinafter defined. The processing aid of this invention can be added to an emulsion polymerization recipe ab initio with any of the ingredients or alternatively can be added to the latex just prior to coagulation, it being incorporated into the polymer as it is coagulated and separated.

The amino acid compound is characterized by the structural formula

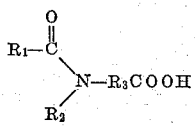

wherein $R_1$ is a monovalent aliphatic radical or aromatic hydrocarbon radical, $R_2$ is hydrogen, a monovalent aliphatic radical or aromatic hydrocarbon radical, these $R_1$ and $R_2$ radicals each containing up to about 20 carbon atoms, and $R_3$ is a divalent aliphatic hydrocarbon radical containing from 1 to about 6 carbon atoms. The radicals can have straight or branched chains and can be substituted or unsubstituted.

Preferably $R_1$ and $R_2$ contain up to about 12 carbon atoms and $R_3$ contains from 1 to about 3 carbon atoms. Preferably, $R_3$ is a methylene group or polymethylene group containing up to about 3 carbon atoms. Where $R_2$ is a hydrocarbon radical, the $R_1$ and $R_2$ radicals can be either saturated or unsaturated but are preferably either an alkyl or alkylene radical; but more preferably an alkyl radical.

Particularly preferred of all the compounds of the invention are those characterized by containing not more than a total of about 12 carbon atoms in the molecule, and wherein one of the radicals $R_1$ and $R_2$, is alkyl and the other phenyl. In such class of compounds $R_3$ is preferably a methylene group.

An outstanding processing aid is N-acetyl-N-phenyl amino acetic acid.

Suitably from 1 to about 6 parts of the processing aid, per 100 parts of polymer, is incorporated into the rubber-like polymers as during polymerization to improve its processing characteristics. While greater amounts of the processing aid can be used the benefits obtained are not generally proportional to the additional concentration. In most usages, it is sufficient to incorporate from about 2 to about 4 parts of the processing aid, per 100 parts of polymer, into the rubber-like polymer.

Exemplary of the most preferred compounds suitable for the practice of this invention are N-acetyl-N-phenyl amino acetic acid, N-propionyl-N-phenyl amino acetic acid, N-butyryl-N-phenyl amino acetic acid and the like.

Other preferred compounds include, for example, N-isobutyryl-N-phenyl amino acetic acid, N-heptanoyl-N-phenyl amino acetic acid, N-dodecanoyl-N-phenyl amino acetic acid, N-benzoyl-N-phenyl amino propionic acid, N-benzoyl-N-octyl-aminopropionic acid, N-naphthoyl-N-dodecyl-aminopropionic acid, N-pentanoyl-N-propyl amino butanoic acid, N-benzoyl-N-dodecyl amino butanoic acid and the like.

Exemplary of other compounds useful as processing agents are N-tridecanoyl-N-stearyl amino pentanoic acid, N-pentadecanoyl-N-octyl amino pentanoic acid, N-pentadecanoyl-N-nonyl amino hexanoic acid, N-heptadecanoyl-N-tridecyl amino hexanoic acid, N-heptadecanoyl-N-tridecyl amino heptanoic acid, N-eicosanoyl-N-tridecyl amino heptanoic acid and the like.

The following non-limiting examples illustrate the invention. All parts are by weight unless otherwise specified.

As will be seen, these examples demonstrate the outstanding ability of amino acid compounds as processing aids. Thus, these agents, when added to a polymerization recipe, greatly improve the milling behavior of the resultant polymer. Milling behavior is the ability of the rubber-like polymer to mill readily and easily; and without bagging and excessive sticking. The tack of the milled polymer is also greatly improved. Tack is that characteristic which causes a polymer to adhere to itself, this property being essential in the construction of composite articles such as tires. Further, it will also be seen that these processing aids when incorporated into a polymer at the time of polymerization improve the extrusion properties of the milled polymer. Thus, the milled polymer can extrude readily and uniformly through a die, and the extruded material will possess a smooth surface with sharp edges, as is desired.

Example 1

Within a glass-lined reaction vessel equipped with agitating means and temperature control and measuring means is prepared a butadiene polymer by emulsion polymerization at 41° F. in accordance with the following recipe.

| Components: | Parts |
| --- | --- |
| Butadiene | 100 |
| Potassium salt of disproportionated rosin | 2.25 |
| Sodium fatty acid soap | 2.14 |
| Tri-potassium phosphate | .44 |
| Sodium alkyl naphthalene sulfonate | .15 |
| Paramenthane hydroperoxide | .09 |
| Sodium hydroxide | .045 |
| Ter-dodecyl mercaptan | 0.35 |
| Sodium formaldehyde sufoxylate | .05 |
| $FeSO_4 7H_2O$ | .015 |
| Tetra sodium salt of ethylene diamine tetra acetic acid | .04 |
| Water | 200.0 |
| N-acetyl-N-phenyl amino acetic acid | 3.0 |

The reaction reaches 80% conversion in 11.5 hours and at that time is shortstopped with 0.10 part sodium dithiocarbomate and 0.5 part mixed amines.

A mass of 100 parts of the polybutadiene, having a Mooney viscosity of 40 ML–4 is passed twice, without banding, through a 6 x 12 inch roll set at 0.008 inch and maintained at a temperature of 60–80° F. The polymer is then banded on the front roll with the mill set at 0.055 inch and ¾ inch cuts made from alternate sides at 30 second intervals for a period of two minutes. At a uniform rate is then added 50 parts of carbon black. The mill is opened to 0.065 inch after half of the black is added and one ¾ inch cut made from each side. Addition of the black requires 12 minutes. The mill is then opened to 0.075 inch and ¾ inch cut made from each side. The following compounding ingredients are then added over a period of four minutes.

| Ingredient: | Parts |
| --- | --- |
| Zinc oxide | 12 |
| Sulfur | 7 |
| Stearic acid | 4 |
| Antioxidant | 4 |
| Accelerator | 3.6 |

After addition is complete, three ¾ inch cuts are made each way over a period of two minutes. The batch is then cut from the mill, the mill set at 0.030 inch, and the rolled strip passed through the mill endwise six times over a two minute period. The mill is then opened to 0.25 inch and the stock passed through four times in 30 seconds, the stock being folded back on itself each time. The mill processing behavoir of the polymer is excellent. It bands well, is free of bagging and readily accepts the carbon black. The tack of the milled polymer is excellent.

In contrast, when the same polymer is identically processed but the polybutadiene is not polymerized in the presence of, nor is any of the N-acetyl-N-phenyl amino acetic acid incorporated in any way into the polymer, the polymer exhibits poor mill behavior accompanied by some shredding and a tendency to bag. The milled polymer is substantially devoid of tack.

Example 2

When the foregoing example is repeated with N-butyryl-N-phenyl amino acetic acid as a processing aid very good results are also obtained. Thus, the milling behavior of the stock proves to be very good and the milled polymer exhibits good tackiness and extrudibility.

Example 3

The procedure of Example 1 is repeated except that one part of N-isobutyryl-N-phenyl amino acetic acid is added to the plastic material. Very good results are obtained, as contrasted to similar runs wherein no processing aid is used.

Example 4

The procedure of Example 1 is repeated using 3 parts N-dodecanoyl-N-phenyl amino acetic acid, N-naphthoyl-N-decyl amino propionic acid as processing aids. Again improved milling and tack properties are observed.

Example 5

The procedure of Example 1 is repeated using 1, 2, 4 and 6 parts of N-tridecanoyl-N-stearyl amino pentanoic acid and N-eicosanoyl-N-tridecanyl amino heptanoic acid, respectively. In each instance improved processing, tack and extrusion properties are observed. At the higher concentrations the improvement appears more pronounced.

Example 6

The procedure of Example 1 is again repeated except that 100 parts of an emulsion polymerized polybutadiene polymer of 32 ML–4 Mooney viscosity is processed with 4 parts of N-acetyl-N-phenyl amino acetic acid. The polymer not only exhibits substantially improved milling, tack and extrusion properties but also accepts pigments far better than does a processing aid-free polymer.

Example 7

The procedure of Example 6 is repeated except that the carbon black and the resinous processing aid are incorporated in the polymer by direct addition to the latex. The latex is then coagulated, washed and dried. On milling of the resultant masterbatch, similar improved properties are observed.

Example 8

A 70 ML–4 Mooney viscosity styrene-butadiene latex is prepared as in Example 1, and in the presence of 3 parts of N-acetyl-N-phenyl amino acetic acid. The latex is masterbatched in sufficient quantity with 75 parts of carbon black to give, when coagulated, a black masterbatch containing 100 parts of polymer. The milling procedure of Example 1 is repeated using 10 parts of zinc oxide, 2 parts of sulfur and 1.75 parts of benzothiazyldisulfide. A smooth milling performance is obtained; considerably superior to that obtained in the absence of the processing aid of this invention.

Example 9

The preceding examples in which carbon black is incorporated are repeated except that the carbon black is omitted. The white rubber products thus obtained exhibit similar improved properties to those containing carbon black.

As will be apparent to those skilled in the art the invention is subject to some changes and alterations without departing from the spirit and scope of the appended claims.

We claim:

1. In an emulsion polymerization process for the preparation of a synthetic rubber-like butadiene polymer the improvement which comprises: incorporating in said polymer as a processing aid an effective amount of an amino acid compound characterized by the structural formula

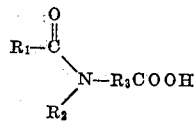

wherein $R_1$ is selected from monovalent aliphatic hydrocarbon radicals and aromatic hydrocarbon radicals, $R_2$ is selected from hydrogen, monovalent aliphatic hydrocarbon radicals and aromatic hydrocarbon radicals, these $R_1$ and $R_2$ radicals each containing up to about 20 carbon atoms, and $R_3$ is a divalent aliphatic hydrocarbon radical containing from 1 to about 6 carbon atoms.

2. In an emulsion polymerization process for the preparation of a synthetic rubber-like butadiene polymer the improvement which comprises: incorporating in said polymer as a processing aid an effective amount of an amino acid compound characterized by the structural formula

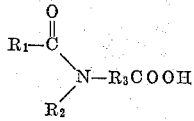

wherein $R_1$ is selected from monovalent aliphatic hydrocarbon radicals and aromatic hydrocarbon radicals, $R_2$ is selected from hydrogen, monovalent aliphatic hydrocarbon radicals and aromatic hydrocarbon radicals, these $R_1$ and $R_2$ radicals each containing up to about 12 carbon atoms, and $R_3$ is a divalent aliphatic hydrocarbon radical containing from 1 to about 3 carbon atoms.

3. In an emulsion polymerization process for the preparation of a synthetic rubber-like polymer the improvement which comprises: incorporating in said polymer as a processing aid an effective amount of an amino acid compound characterized by the structural formula

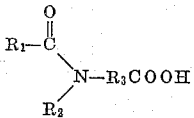

wherein $R_1$ is an alkyl radical containing up to about 12 carbon atoms, $R_2$ is phenyl and $R_3$ is a methylene group.

4. The method of claim 3 wherein the processing aid is N-acetyl-N-phenyl amino acetic acid.

5. The method of claim 1 wherein the butadiene polymer within which the processing aid is incorporated is polybutadiene.

6. The method of claim 1 wherein the butadiene polymer within which the processing aid is incorporated comprises a copolymer of styrene and butadiene.

7. An unprocessed composition readily processible by a combination of mechanical working and temperature control steps comprising a synthetic rubber-like butadiene polymer and as a processing aid an effective amount of an amino acid compound characterized by the structural formula

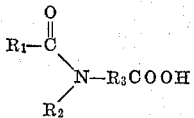

wherein $R_1$ is selected from monovalent aliphatic hydrocarbon radicals and aromatic hydrocarbon radicals, $R_2$ is selected from hydrogen, monovalent aliphatic hydrocarbon radicals and aromatic hydrocarbon radicals, these $R_1$ and $R_2$ radicals each containing up to about 20 carbon atoms, and $R_3$ is a divalent aliphatic hydrocarbon radical containing from 1 to about 6 carbon atoms.

8. In an emulsion polymerization process for the preparation of a synthetic rubber-like butadiene polymer the improvement which comprises: incorporating in said polymer as a processing aid an effective amount of an amino acid compound characterized by the structural formula

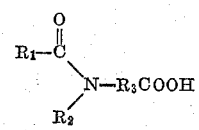

wherein $R_1$ and $R_2$ are selected from monovalent aliphatic hydrocarbon radicals and aromatic hydrocarbon radicals, these $R_1$ and $R_2$ radicals each containing up to about 20 carbons atoms, and $R_3$ is a divalent aliphatic hydrocarbon radical containing from 1 to about 6 carbon atoms.

9. In an emulsion polymerization process for the preparation of a synthetic rubber-like butadiene polymer the improvement which comprises: incorporating in said polymer as a processing aid an effective amount of an amino acid compound characterized by the structural formula

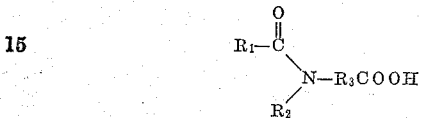

wherein $R_1$ and $R_2$ are selected from monovalent aliphatic hydrocarbon radicals and aromatic hydrocarbon radicals, these $R_1$ and $R_2$ radicals each containing up to about 12 carbon atoms, and $R_3$ is a divalent aliphatic hydrocarbon radical containing from 1 to about 3 carbon atoms.

10. A process in accordance with claim 9 wherein $R_2$ is an aromatic radical.

11. A process in accordance with claim 9 wherein $R_2$ is an aliphatic radical.

12. A process in accordance with claim 11 wherein $R_1$ is an aliphatic radical.

13. A process in accordance with claim 12 wherein $R_1$ and $R_2$ are both alkyl radicals.

14. An unprocessed composition readily processible by a combination of mechanical working and temperature control steps comprising a synthetic rubber-like butadiene polymer and as a processing aid an effective amount of an amino acid compound characterized by the structural formula

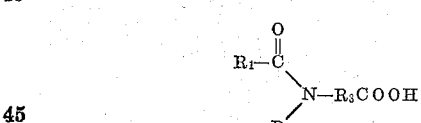

wherein $R_1$ and $R_2$ are selected from monovalent aliphatic hydrocarbon radicals and aromatic hydrocarbon radicals, these $R_1$ and $R_2$ radicals each containing up to about 20 carbon atoms, and $R_3$ is a divalent aliphatic hydrocarbon radical containing from 1 to about 6 carbon atoms.

15. A composition in accordance with claim 14 wherein $R_2$ is an aromatic radical.

16. A composition in accordance with claim 14 wherein $R_2$ is an aliphatic radical.

17. A composition in accordance with claim 16 wherein $R_1$ is an aliphatic radical.

18. A composition in accordance with claim 17 wherein $R_1$ and $R_2$ are both alkyl radicals.

References Cited by the Examiner

UNITED STATES PATENTS 2,684,954   7/54   Miller.
2,702,820   2/55   Tummes et al. _____ 260—518

MORRIS LIEBMAN, *Primary Examiner.*